US006576698B1

(12) United States Patent
Weitzel

(10) Patent No.: US 6,576,698 B1
(45) Date of Patent: Jun. 10, 2003

(54) PROCESS FOR THE PREPARATION OF VINYL ESTER/(METH)ACRYLATE COPOLYMERS

(75) Inventor: Hans-Peter Weitzel, Reischach (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 84 days.

(21) Appl. No.: 09/721,841

(22) Filed: Nov. 24, 2000

(30) Foreign Application Priority Data

Dec. 23, 1999 (DE) .......................................... 199 62 566

(51) Int. Cl.[7] ................................................ C08L 9/04
(52) U.S. Cl. ........................ 524/459; 524/459; 524/458; 524/524; 524/525; 524/502; 524/503; 526/65; 526/319
(58) Field of Search ................................ 524/459, 524, 524/525, 502, 503, 458; 526/65, 319

(56) References Cited

U.S. PATENT DOCUMENTS

| 3,883,489 A | | 5/1975 | Matschke ............... 260/78.5 R |
| 4,263,191 A | * | 4/1981 | Eck et al. ....................... 524/3 |
| 4,528,315 A | * | 7/1985 | Eck et al. ..................... 524/458 |
| 5,747,578 A | | 5/1998 | Schmitz et al. ............. 524/502 |
| 5,753,036 A | | 5/1998 | Hornaman et al. ......... 106/810 |
| 5,763,508 A | | 6/1998 | Hess ............................. 524/5 |
| 5,907,011 A | * | 5/1999 | Jakob et al. ................ 524/524 |
| 2002/0035192 A1 | * | 3/2002 | Weitzel ....................... 524/459 |

FOREIGN PATENT DOCUMENTS

| DE | 1 173 252 | 7/1964 |
| DE | 1 494 002 | 11/1970 |
| DE | 2 214 410 | 10/1973 |
| EP | 0 432 811 | 6/1991 |
| EP | 5 576 844 | 1/1994 |
| EP | 0 757 065 | 2/1997 |
| EP | 0 765 898 | 4/1997 |
| GB | 934662 | 8/1963 |
| WO | 99/06454 | 2/1999 |
| WO | 99/42504 | 8/1999 |

OTHER PUBLICATIONS

English Abstract corresponding to DE 1173252.
T. G. Fox, Bull. Am. Physics Soc., 1,3, page 123 (1956).
Polymer Handbook, 2nd Edition, J. Wiley & Sons, New York (1975).

* cited by examiner

Primary Examiner—David W. Wu
Assistant Examiner—Henry S Hu
(74) Attorney, Agent, or Firm—Brooks & Kushman P.C.

(57) ABSTRACT

The invention provides a process for the preparation of polyvinyl alcohol-stabilized Polymers base on vinyl ester, (meth)acrylate, and optionally ethylene monomers In the form of their aqueous dispersions and dispersion powders redispersible in water, by means of free radical emulsion polymerization of suspension polymerization of one or more monomers from the group consisting of the esters of acrylic acid and methacrylic acid with vinyl esters, optionally ethylene and optionally further monomers copolymerizable therewith, in the presence of one ormore polyvinyl alcohol protective colloids, and option ally drying of the aqueous dispersion obtainable thereby, wherein a) from 50 to 100% by weight of the total weight of vinyl ester monomers employed, from 0 to 40% by weight of the total weight of (meth)acrylate monomers employed and at least 80% by weight of the total weight of ethylene employed are initially introduced in the polymerization and b) the polymerization is carried out at a temperature of $\geq 60°$ C.

11 Claims, No Drawings

PROCESS FOR THE PREPARATION OF VINYL ESTER/(METH)ACRYLATE COPOLYMERS

BACKGROUND OF THE INVENTION

1) Field of the Invention

The invention relates to a process for the preparation of polyvinyl alcohol-stabilized copolymers based on vinyl ester and (meth)acrylate comonomers in the form of their aqueous dispersions and dispersion powders redispersible in water, and their use.

2) Background Art

Protective colloid-stabilized polymers are used in particular in the form of their aqueous dispersions or polymer powders redispersible in water in various applications, for example as coating materials or adhesives for various substrates. The protective colloids used are as a rule polyvinyl alcohols. The use of polyvinyl alcohol is desirable because, in comparison with systems which are stabilized by low molecular weight compounds (emulsifiers), it itself contributes to the strength (e.g. adhesive strengths in tile adhesive).

The monomers preferably used to date for the preparation of redispersible powders are vinyl esters and ethylene, since the stabilization of acrylate copolymers or styrene/acrylate copolymers by polyvinyl alcohol is not so simple to realize. In particular, it is not a trivial matter to stabilize an acrylate dispersion with polyvinyl alcohol alone so that the powders resulting therefrom are stable to blocking and have a long shelf life. Furthermore, the combination of vinyl ester and ethylene with (meth)acrylates is for the same reason rarely described (for example in EP-A 765898). More frequently described on the other hand are aqueous dispersions based on these, e.g. vinyl acetate/butyl acrylate copolymers or vinyl acetate/acrylate/ethylene copolymers. However, these dispersions are emulsifier-stabilized and therefore cannot be sprayed to give redispersible powders.

With the use of the combination of vinyl ester with ethylene, the obtainable Tg range is limited to a range of from about +30° C. (vinyl acetate homopolymer) to about −25° C. Higher glass transition temperatures are not obtainable since there is no monomer which is suitable for this system and leads to higher glass transition temperatures than vinyl acetate; for ecological reasons, vinyl chloride is no longer contemporary and is scarcely used any more. On the other hand, lower glass transition temperatures than −25° C. can be obtained only with difficulty since amounts of ethylene of substantially more than 50 mol % are required for this purpose in the monomer mixture. Although these polymers having a high ethylene content can be prepared, they tend to crystallize so that a well defined glass transition temperature is no longer found; moreover, these polymers do not have the highly resilient properties expected for this Tg.

By combining vinyl ester and ethylene with (meth)acrylates, it would be possible to extend the Tg range to higher and lower Tg ranges. This may be contrasted with the initially described problems in the preparation of such systems with stabilization by polyvinyl alcohol alone, which systems are required for producing redispersible powders. The greatly differing copolymerization parameters and the associated poorer reactivity of the components are also problematic in the case of the combination of vinyl esters and ethylene with acrylates.

However, problems may occur not only in the preparation but also during the use of products based on vinyl ester copolymers containing ethylene and acrylate. Particularly when polymers are used in the form of their redispersion powders for improving the mortar properties, the main field of use of the redispersion powders, the formulation must remain stable over a certain time and may not substantially change their processing consistency (viscosity or cement stability); this is because the user cannot be expected to have to mix a new mixture within a short timespan. In the concrete and mortar industry, moreover, the mechanical properties, such as the compressive strength, the porosity and hence the air pore content, play a substantial role. If too many air pores are present, the compressive strength decreases considerably; if too few or no air pores are present in the mortar or concrete, the building material is not sufficiently stable to freezing and thawing. The hydraulically setting systems treated with the dispersion powder should moreover ensure better adhesion than the untreated systems.

DE-A 2214410 (U.S. Pat. No. 3,883,489) describes a process for the preparation of aqueous dispersions or dispersion powders redispersible in water and based on vinyl acetate/ethylene copolymers. The polymerization is carried out at a temperature of 60° C. and in the presence of emulsifiers and polyvinyl alcohol. The preparation of emulsifier-free, purely polyvinyl alcohol-stabilized vinyl ester/(meth)acrylate copolymers is not described.

EP-A 765898 (U.S. Pat. No. 5,763,508) discloses a dispersion or a dispersion powder based on a polyvinyl alcohol-stabilized vinyl acetate/vinyl versatate/butyl acrylate copolymer. No information is provided about the process for the preparation.

EP-A 432811 describes the preparation of emulsifier-stabilized vinyl ester/(meth)acrylate copolymer dispersions and dispersion powders, in which the monomer mixture is metered in continuously as a preliminary emulsion. The preparation of polyvinyl alcohol-stabilized vinyl ester/(meth)acrylate copolymers is not described.

EP-A 576844 describes, inter alia, the preparation of vinyl acetate/ethylene/acrylate copolymer dispersions and dispersion powders. The use of emulsifiers is expressly recommended, and the use of protective colloids other than polyvinyl alcohol is described as being advantageous.

WO-A 99/42504 describes a process for the preparation of vinyl ester/(meth)acrylate copolymer dispersions, in which the copolymer is prepared in the presence of a mixture of nonionic emulsifier and polyvinyl alcohol, and the comonomers are metered in continuously as a mixture.

EP-A 757065 (U.S. Pat. No. 5,447,578) describes the preparation of protective colloid-stabilized vinyl acetate/ethylene copolymers in the form of their aqueous dispersions and dispersion powders redispersible in water. Two-phase polymers having a first ethylene-rich, semicrystalline phase and a second low-ethylene phase are obtainable thereby. The copolymerization of (meth)acrylates is not discussed.

SUMMARY OF THE INVENTION

It was therefore the object of the invention to provide a stable, low-viscosity, polyvinyl alcohol-stabilized dispersion and corresponding dispersion powders redispersible in water, stable to blocking and based on monomers from the group consisting of the vinyl esters, ethylene and (meth)acrylates, in particular methacrylates, which, when used in cement-related applications, have completely satisfactory viscosity stability or cement stability and do not prevent the cement from setting.

The invention relates to a process for the preparation of polyvinyl alcohol-stabilized polymers based on vinyl ester, (meth)acrylate and optionally ethylene monomers in the form of their aqueous dispersions and dispersion powders redispersible in water, by means of free radical emulsion polymerization or suspension polymerization of one or more monomers from the group consisting of the esters of acrylic acid and methacrylic acid with vinyl esters, optionally ethylene and optionally further monomers copolymerizable therewith, in the presence of one or more polyvinyl alcohol protective colloids, and optionally drying of the aqueous dispersion obtained thereby, wherein a) from 50 to 100% by weight of the total weight of vinyl ester monomers employed, from 0 to 40% by weight of the total weight of (meth)acrylate monomers employed and at least 80% by weight of the total weight of ethylene employed are initially introduced in the polymerization and b) the polymerization is carried out at a temperature of $\geq 60°$ C.

DESCRIPTION OF THE PREFERRED EMBODIMENTS

Suitable monomers from the group consisting of the esters of acrylic acid or methacrylic acid are esters of straight-chain or branched alcohols having 1 to 15 carbon atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Methyl acrylate, methyl methacrylate, n-butyl acrylate, 2-ethylhexyl acrylate and norbornyl acrylate are particularly preferred. Methyl methacrylate is most preferred. Said (meth)acrylate monomers are copolymerized in general in an amount of from 1 to 70% by weight, preferably from 5 to 40% by weight, based on the total weight of the monomers.

Suitable vinyl esters are vinyl esters of straight-chain or branched carboxylic acids having 1 to 15 carbon atoms. Preferred vinyl esters are vinyl acetate, vinyl propionate, vinyl butyrate, vinyl 2-ethylhexanoate, vinyl laurate, 1-methyl vinyl acetate, vinyl pivalate and vinyl esters of α-branched monocarboxylic acids having 9 to 11 carbon atoms, for example VeoVa9® or VeoVa10® (trade names of Shell). Vinyl acetate is particularly preferred. Said vinyl ester monomers are copolymerized in general in an amount of from 30 to 90% by weight, based on the total weight of the monomers.

The amount of ethylene is from 0 to 40% by weight, preferably from 5 to 25% by weight, based in each case on the total weight of the monomers.

Optionally, from 0.05 to 10% by weight, based on the total weight of the monomer mixture, of auxiliary monomers may also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and maleic anhydride, ethylenically unsaturated sulfonic acids and their salts, preferably vinyl sulfonic acid, and 2-acrylamido-2-methyl-propanesulfonic acid. Further examples are precrosslinking comonomers, such as polyethylenically unsaturated comonomers, for example divinyl adipate, diallyl maleate, allyl methacrylate or triallyl cyanurate, or postcrosslinking comonomers, for example acrylamidoglycollic acid (AGA), methylacrylamidoglycollic acid methyl ester (MAGME), N-methylolacrylamide (NMA), N-methylolmethacrylamide and N-methylol allylcarbamate; alkyl ethers, such as isobutoxy ether, or esters of N-methylolacrylamide, of N-methylolmethacrylamide and of N-methylol allyl carbamate. Comonomers having epoxide functional groups, such as glycidyl methacrylate and glycidyl acrylate, are also suitable. Further examples are comonomers having silicon functional groups, such as acryloyloxy-propyl-tri(alkoxy)silanes and methacryloyloxy-propyltri(alkoxy)silanes, vinyltrialkoxysilanes and vinylmethyldialkoxysilanes, where, for example, ethoxy and ethoxy-propylene glycol ether radicals may be present as alkoxy groups. Monomers having hydroxyl and CO groups may also be mentioned, for example hydroxyalkyl methacrylates and acrylates, such as hydroxyethyl, hydroxypropyl or hydroxybutyl acrylate or methacrylate, and compounds such as diacetoneacrylamide and acetylacetoxyethyl acrylate or methacrylate.

Copolymers of vinyl acetate with one or more monomers from the group consisting of methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate, and optionally ethylene, are particularly preferred. In particular, copolymers of vinyl acetate and ethylene with n-butyl acrylate or 2-ethylhexyl acrylate; and vinyl acetate/acrylate copolymers with one or more monomers from the group consisting of methyl acrylate, ethyl acrylate, propyl acrylate, n-butyl acrylate, 2-ethylhexyl acrylate and norbornyl acrylate, where said copolymers may optionally also contain the abovementioned auxiliary monomers. Most preferred are copolymers of vinyl acetate and methyl methacrylate and copolymers of vinyl acetate, methyl methacrylate and ethylene, where said copolymers may optionally also contain the above-mentioned auxiliary monomers.

The choice of monomers or the choice of the amounts by weight of the comonomers is made in such a way that in general a glass transition temperature Tg of from −50° C. to +50° C. results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956), the following is applicable: $1/Tg = x_1/Tg_1 + x_2/Tg_2 + \ldots + x_n/Tg_n$, where $x_n$ represents the mass fraction (% by weight/100) of the monomer n and $Tg_n$ is the glass transition temperature in Kelvin of the homopolymer of the monomer n. Tg values for homopolymers are shown in Polymer Handbook 2nd Edition, J. Wiley & Sons, New York (1975).

Preferably, said polymers, particularly in the case of the copolymers of vinyl acetate, methyl methacrylate and optionally ethylene, have a Fikentscher K value (DIN 53726) of from 65 to 80.

The preparation is carried out by the emulsion polymerization process or by the suspension polymerization process, preferably by the emulsion polymerization process, the polymerization temperature being in general from 60° C. to 100° C., preferably from 65° C. to 90° C., particularly preferably from 80° C. to 90° C. In the copolymerization of gaseous comonomers, such as ethylene, it is also possible to employ pressure, in general between 5 bar and 100 bar.

The polymerization is initiated with the water-soluble or monomer-soluble initiators or redox initiator combinations usually used for the emulsion polymerization or suspension polymerization. Examples of water-soluble initiators are the sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumyl hydroperoxide, isopropylbenzene monohydroperoxide and azobisisobutyronitrile. Examples of monomer-soluble initiators are diacetyl peroxydicarbonate, dicyclohexyl peroxydicarbonate and dibenzoyl peroxide. The initiators are used in an amount of from 0.02 to 2.0% by weight, preferably from 0.3 to 0.7% by weight, based in each case on the total weight of the monomers.

Redox initiators used are combinations of the initiators with reducing agents. Suitable reducing agents are the sulfites and bisulfites of the alkali metals and of ammonium, for example sodium sulfite, the derivatives of sulfoxylic acid, such as zinc or alkali metal formaldehyde sulfoxylates, for example sodium hydroxymethanesulfinate, and ascorbic acid. The amount of reducing agent is preferably from 0.01 to 3% by weight, based on the total weight of the monomers.

In order to control the molecular weight, regulating substances can be used during the polymerization. If regulators are used, they are employed in amounts of from 0.01 to 5.0% by weight, based on the monomers to be polymerized, and are metered in separately or premixed with reaction components. Examples of such substances are n-dodecyl mercaptan, tert-dodecyl mercaptan, mercaptopropionic acid, methyl mercapto-propionate, isopropanol and acetaldehyde.

Suitable polyvinyl alcohols are partially hydrolyzed or completely hydrolyzed polyvinyl alcohols. Partially hydrolyzed polyvinyl alcohols having a degree of hydrolysis of from 80 to 95 mol % and a Höppler viscosity, in 4% strength aqueous solution, of from 1 to 30 mPas (Höppler method at 20° C., DIN 53015) are preferred. Partially hydrolyzed polyvinyl alcohols rendered hydrophobic and having a degree of hydrolysis of from 80 to 95 mol % and a Höppler viscosity, in 4% strength aqueous solution, of from 1 to 30 mPas are also suitable. Examples of these are partially hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 or 11 carbon atoms, dialkyl maleates and dialkyl fumarates, such as diisopropyl maleate and diisopropyl fumarate, vinyl chloride, vinyl alkyl ethers, such as vinyl butyl ether, and olefins, such as ethene and decene. The amount of the hydrophobic units is preferably from 0.1 to 10% by weight, based on the total weight of the partially hydrolyzed polyvinyl alcohol. Mixtures of said polyvinyl alcohols may also be used.

Further suitable polyvinyl alcohols are partially hydrolyzed polyvinyl alcohols which have been rendered hydrophobic and are obtained by polymer-analogous reaction, for example acetalation of the vinyl alcohol units with $C_1$- to $C_4$-aldehydes, such as butyraldehyde. The amount of the hydrophobic units is preferably from 0.1 to 10% by weight, based on the total weight of the partially hydrolyzed polyvinyl acetate. The degree of hydrolysis is from 80 to 95 mol %, preferably from 85 to 94 mol %, and the Höppler viscosity (DIN 53015, Höppler method, 4% strength aqueous solution) is from 1 to 30 mPas, preferably from 2 to 25 mpas.

Most preferred are polyvinyl alcohols having a degree of hydrolysis of from 85 to 94 mol % and a Höppler viscosity, in 4% strength aqueous solution, of from 3 to 15 mPas (Höppler method at 20° C., DIN 53015). The protective colloids are obtainable by means of the process known to those skilled in the art.

The polyvinyl alcohols are added in general in a total amount of from 1 to 20% by weight, based on the total weight of the monomers, during the polymerization. The amount of protective colloid can either be completely initially introduced or partly initially introduced and partly metered in. Preferably, at least 5% by weight of the protective colloid are initially introduced and most preferably the amount of protective colloid is completely initially introduced.

In the process according to the invention, polymerization is preferably effected without the addition of emulsifiers. In exceptional cases, it may be advantageous additionally to use small amounts of emulsifiers, optionally from 1 to 5% by weight, based on the amount of monomers. Suitable emulsifiers are anionic, cationic and nonionic emulsifiers, for example anionic surfactants, such as alkylsulfates having a chain length of 8 to 18 carbon atoms, alkyl or alkylaryl ether sulfates having 8 to 18 carbon atoms in the hydrophobic radical, and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants, such as alkyl polyglycol ethers or alkylaryl polyglycol ethers having 8 to 40 ethylene oxide units.

In the procedure according to the invention, from 50 to 100% by weight of the vinyl ester monomers, from 0 to 40% by weight of the (meth)acrylate monomers and at least 80% by weight of ethylene, if this is copolymerized, are initially introduced and the remainder in each case is metered in after initiation of the polymerization. In a preferred procedure, from 80 to 100% by weight, based on the total weight of the vinyl ester monomers, are initially introduced and the remainder is metered in. In the copolymerization with methacrylate monomers, 100% by weight of the vinyl esters are particularly preferably initially introduced. The (meth) acrylate monomers are preferably initially introduced in an amount of from 0 to 20% by weight, based on the total weight, and the remainder is metered in. In the copolymerization of methacrylate monomers, these are particularly preferably not initially introduced but metered in in an amount of 100% by weight. The metering operation can be carried out separately (spatially and in terms of time) or some or all of the components to be metered can be preemulsified and then metered. The monomer conversion is controlled by means of the initiator metering. The initiators as a whole are metered in so that continuous polymerization is ensured.

After the end of the polymerization, residual monomers can be removed by postpolymerization using known methods, for example by postpolymerization initiated with a redox catalyst. Volatile residual monomers can also be removed by means of distillation, preferably under reduced pressure, and optionally while passing through or passing over inert entraining gases, such as air, nitrogen or steam.

The aqueous dispersions obtainable by the process according to the invention have a solids content of from 30 to 75% by weight, preferably from 50 to 60% by weight. For the preparation of the polymer powders redispersible in water, the aqueous dispersions, optionally after addition of protective colloids as an atomizing aid, are dried, for example by means of fluidized-bed drying, freeze-drying or spray-drying. Preferably, the dispersions are spray-dried. The spray-drying is effected in conventional spray-drying units, it being possible to carry out the atomization by means of airless high-pressure nozzles, binary nozzles or multi-medium nozzles or by means of a rotating disk. The outlet temperature is generally chosen to be in the range from 45° C. to 120° C., preferably from 60° C. to 90° C., depending on the unit, Tg of the resin and desired degree of drying.

As a rule, the atomizing aid is used in a total amount of from 3 to 30% by weight, based on the polymeric components of the dispersion. That is to say the total amount of protective colloid before the drying process should be at least 3 to 30% by weight, based on the amount of polymer, preferably from 5 to 20% by weight, based on the amount of polymer.

Suitable atomizing aids are partially hydrolyzed polyvinyl alcohols; polyvinylpyrrolidones; polysaccharides in water-soluble form, such as starches (amylose and amylopectin), celluloses and their carboxymethyl, methyl, hydroxyethyl and hydroxypropyl derivatives; proteins, such as casein or caseinate, soy protein and gelatin; ligninsulfonates; synthetic polymers, such as poly(meth)acrylic acid, copolymers of (meth)acrylates with carboxy-functional comonomer units, poly(meth)acrylamide, polyvinylsulfonic acids and their water-soluble copolymers; melamine formaldehyde sulfonates, naphthalene formaldehyde sulfonates, styrene/maleic acid and vinyl ether maleic acid copolymers. Preferably, no further protective colloids other than polyvinyl alcohols are used as an atomizing aid.

During the atomization, a content of up to 1.5% by weight of antifoam, based on the base polymer, have proven advantageous. To increase the storability by improving the blocking stability, in particular in the case of powders having a low glass transition temperature, the powder obtained may be provided with an antiblocking agent (anticaking agent), preferably in an amount of up to 30% by weight, based on the total weight of the polymeric components. Examples of antiblocking agents are calcium and magnesium carbonate, talc, gypsum, silicic acid, kaolins, and silicates having particle sizes preferably in the range from 10 nm to 10 $\mu$m.

The viscosity of the feed to be atomized is adjusted by means of the solids content in such a way that a value of <500 mPas (Brookfield viscosity at 20 revolutions and 23° C.), preferably <250 mPas, is obtained. The solids content of the dispersion to be atomized is >35%, preferably >40%.

In order to improve the performance characteristics, further additives may be added during the atomization. Further components of dispersion powder compositions, which components are contained in preferred embodiments, are, for example, pigments, fillers, foam stabilizers and water repellents.

The aqueous polymer dispersions and the protective colloid-stabilized polymer powders redispersible in water can be used in the applications typical therefor, for example in chemical products for the building industry in conjunction with hydraulically setting binders, such as cements (Portland cement, high-alumina cement, trass cement, slag cement, magnesium oxychloride cement, phosphate cement), gypsum and waterglass, for the preparation of construction adhesives, renders, filling compounds, floor filling compounds, sealing slurries, joint mortar and paints, and furthermore as sole binders for coating materials and adhesives or as coating materials or binders for textiles and paper.

A particularly preferred use of the dispersions and powders is that in cement-containing construction adhesive formulations. Typical formulations contain from 5 to 80% by weight of cement, from 5 to 80% by weight of fillers, such as quartz sand, calcium carbonate or talc, from 0.1 to 2% by weight of thickeners, such as cellulose ethers, sheet silicates or polyacrylates, from 0.5 to 60% by weight of the copolymers in the form of the polymer dispersion or of the polymer powder and optionally further additives for improving the stability, processibility, open time and water resistance. The data in % by weight are always based on 100% by weight of dry mass of the formulation. The cement-containing construction adhesive formulations are used in particular as tile adhesives for laying tiles of all kinds (earthenware, stoneware, porcelain, ceramic, natural tiles) indoors and outdoors and are also mixed with the corresponding amount of water before they are used.

The following examples serve for further explanation of the invention:

EXAMPLE 1

Preparation of a Vinyl Acetate/butyl Acrylate Copolymer 63 kg of water, 84.5 kg of a 20% strength, aqueous solution of a polyvinyl alcohol having a degree of hydrolysis of 88 mol % and a Höppler viscosity of 4 mPas, 350 g of iron ammonium sulfate (1% strength in water) and 21.1 kg of butyl acrylate and 105.6 kg of vinyl acetate were initially introduced into a polymerization vessel having a volume of 400 liters and were heated to 65° C. tert-Butyl hydroperoxide (0.4% strength in water) and brüggolite (sodium hydroxymethanesulfinate) (0.6% strength in water) were then metered in continuously, each at a rate of 3.0 kg/h. From the beginning of the polymerization, detectable from the increase in the internal temperature, the remaining monomer mixture comprising 63.4 kg of butyl acrylate and 21.1 kg of vinyl acetate was metered in continuously in 3 h at 28.2 kg/h. The polymerization was carried out until no further heat of polymerization could be observed. To remove residual monomers, cooling to 30° C. was followed by postpolymerization with 1200 g of tert-butyl hydroperoxide (10% strength in water) and 1000 g of brüggolite (10% strength in water).

A dispersion having a solids content of 55.3%, a viscosity of 1950 mPas (Brookfield 20 at 23° C.), a pH of 4.1 and a particle size diameter Dw of 730 nm was obtained. The sieve residue on sieving over 250 $\mu$m was 350 g. The K value was 66. The free residual monomer was <100 ppm. The dispersion was stable in cement.

EXAMPLE 2

Preparation of a Vinyl Acetate/butyl Acrylate/ethylene Copolymer 2.71 kg of water, 3.39 kg of a 20% strength aqueous solution of a polyvinyl alcohol having a degree of hydrolysis of 88 mol % and a Höppler viscosity of 4 mpas, 15 g of iron ammonium sulfate (1% strength in water) and 0.67 kg of butyl acrylate and 2.79 kg of vinyl acetate were initially introduced into a polymerization vessel having a volume of 18 liters and were heated to 65° C. At the same time, the polymerization vessel was subjected to a pressure of 60 bar of ethylene (corresponding to an amount of 2000 g of ethylene). tert-Butyl hydroperoxide (2.0% strength in water) and brüggolite (sodium hydroxymethanesulfinate) (3.0% strength in water) were then metered in continuously, each at a rate of 60 g/h. From the beginning of the polymerization, detectable from the increase in the internal temperature and the pressure, the remaining monomer mixture comprising 3.56 kg of butyl acrylate was metered in continuously in 3 h at 1.19 kg/h. Polymerization was carried out until no more heat of polymerization could be observed. To remove residual monomers, postpolymerization was effected with 45 g of tert-butyl hydroperoxide (10% strength in water) and 45 g of brüggolite (10% strength in water) after letting down and cooling to 30° C.

A dispersion having a solids content of 50.0%, a viscosity of 271 mPas (Brookfield 20 at 23° C.), a pH of 4.1 and a particle diameter Dw of 850 nm was obtained. The sieve residue on sieving over 250 $\mu$m was 6 g. The free residual monomer was <50 ppm. The dispersion was stable in cement.

EXAMPLE 3

Preparation of a Vinyl Acetate/ethylhexyl Acrylate/ethylene Copolymer 2.65 kg of water, 3.31 kg of a 20% strength aqueous solution of a polyvinyl alcohol having a degree of hydrolysis of 88 mol % and a Höppler viscosity of 4 mpas, 15 g of iron ammonium sulfate (1% strength in water) and 0.66 kg of ethylhexyl acrylate and 2.73 kg of vinyl acetate were initially introduced into a polymerization vessel having a volume of 18 liters and were heated to 65° C. At the same time, the polymerization vessel was subjected to a pressure of 60 bar of ethylene (corresponding to an amount of 1950 g of ethylene) tert-Butyl hydroperoxide (2.0% strength in water) and brüggolite (sodium hydroxymethanesulfinate) (3.0% strength in water) were then metered in continuously, each at a rate of 80 g/h. From the beginning of the polymerization, detectable from the increase in the internal temperature and the pressure, the remaining monomer mixture comprising 3.47 kg of butyl acrylate was metered in continuously in 3 h at 1.16 kg/h. Polymerization was carried out until no more heat of polymerization could be observed. To remove residual monomers, postpolymerization was effected with 45 g of tert-butyl hydroperoxide (10% strength in water) and 45 g of brüggolite (10% strength in water) after letting down and cooling to 30° C.

A dispersion having a solids content of 55.0%, a viscosity of 278 mPas (Brookfield 20 at 23° C.), a pH of 4.2 and a particle diameter Dw of 2520 nm was obtained. The sieve residue on sieving over 250 μm was 8 g. The free residual monomer was <50 ppm. The dispersion was stable in cement.

EXAMPLE 4

Preparation of a Vinyl Acetate/methyl Methacrylate/ethylene Copolymer 2830 g of water, 2220 g of a 20% strength aqueous solution of a polyvinyl alcohol having a degree of hydrolysis of 88 mol % and a Höppler viscosity of 4 mPas, 5 g of iron ammonium sulfate (1% strength in water) and 4860 g of vinyl acetate were initially introduced into a polymerization vessel having a volume of 5 liters and were heated to 85° C. At the same time, 50 bar of ethylene were forced in. tert-Butyl hydroperoxide (10% strength in water) and brüggolite (sodium hydroxymethanesulfinate) (5% strength in water) were then metered in continuously at 60 g/h and 200 g/h, respectively. From the beginning of the polymerization, detectable from the increase in the internal temperature, the remaining monomer mixture comprising 1210 g of methyl methacrylate was metered in continuously in 3 h at 403 g/h. Simultaneously with the monomer metering, 760 g of a 12% strength polyvinyl alcohol solution (polyvinyl alcohol as above) were metered at 254 g/h in the course of 3 h. Polymerization was carried out until no more heat of polymerization could be observed. To remove the residual monomers, postpolymerization was effected with 40 g of tert-butyl hydroperoxide (10% strength in water) and 40 g of brüggolite (10% strength in water) after cooling to 30° C.

A dispersion having a solids content of 49.3%, a viscosity of 620 mPas (Brookfield 20 at 23° C.), a pH of 3.7 and a particle diameter Dw of 1300 nm was obtained. The sieve residue on sieving over 250 μm was 14 g. The K value was 68. The free residual monomer was <100 ppm. The dispersion was stable in cement.

EXAMPLE 5

Preparation of Vinyl Acetate/norbornyl Acrylate/ ethylene Copolymer 932 g of water, 466 g of a 20% strength, aqueous solution of a polyvinyl alcohol having a degree of hydrolysis of 88 mol % and a Höppler viscosity of 4 mPas, 5 g of iron ammonium sulfate (1% strength in water) and 1170 g of vinyl acetate were initially introduced into a polymerization vessel having a volume of 5 liters and were heated to 60° C. At the same time, 40 bar of ethylene were forced in. tert-Butyl hydroperoxide (3% strength in water) and brüggolite (sodium hydroxymethanesulfinate) (5% strength in water) were then metered in continuously, each at 14 g/h. From the beginning of the polymerization, detectable from the increase in the internal temperature, the internal temperature was increased to 80° C. 30 minutes later, the remaining monomer mixture comprising 466 g of norbornyl acrylate and 699 g of vinyl acetate was metered in continuously in 2 h at 585 g/h. Simultaneously with the monomer metering, 755 g of a 12.3% strength polyvinyl alcohol solution (polyvinyl alcohol as above) were metered at 358 g/h in the course of 2 h. The ethylene pressure was kept at 40 bar up to the end of the monomer metering. Polymerization was effected until no more heat of polymerization could be observed. To remove residual monomers, postpolymerization was effected with 15 g of tert-butyl hydroperoxide (10% strength in water) and 15 g of brüggolite (10% strength in water) after cooling to 30° C.

A dispersion having a solids content of 54.5%, a viscosity of 480 mPas (Brookfield 20 at 23° C.), a pH of 3.8 and a particle diameter Dw of 1010 nm was obtained. The sieve residue on sieving over 250 μm was 1 g. The K value was 86 and the Tg 11° C. The free residual monomer was <100 ppm. The dispersion was stable in cement.

EXAMPLE 6

Preparation of a Vinyl Acetate/norbornyl Acetate/ ethylene Copolymer 932 g of water, 466 g of a 20% strength, aqueous solution of a polyvinyl alcohol having a degree of hydrolysis of 88 mol % and a Höppler viscosity of 4 mPas, 5 g of iron ammonium sulfate (1% strength in water) and 1030 g of vinyl acetate and 140 g of norbornyl acrylate were initially introduced into a polymerization vessel having a volume of 5 liters and were heated to 60° C. At the same time, 40 bar of ethylene were forced in. tert-Butyl hydroperoxide (3% strength in water) and brüggolite (sodium hydroxymethanesulfinate) (5% strength in water) were then metered in continuously, each at 14 g/h. From the beginning of the polymerization, detectable from the increase in the internal temperature, the internal temperature was increased to 80° C. 30 minutes later, the remaining monomer mixture comprising 326 g of norbornyl acrylate and 839 g of vinyl acetate was metered in continuously in 2 h at 585 g/h. Simultaneously with the monomer metering, 755 g of a 12.3% strength polyvinyl alcohol solution (polyvinyl alcohol as above) were metered at 358 g/h in the course of 2 h. The ethylene pressure was kept at 40 bar until the end of the monomer metering. Polymerization was effected until no more heat of polymerization could be observed. To remove residual monomer, postpolymerization was effected with 15 g of tert-butyl hydroperoxide (10% strength in water) and 15 g of brüggolite (10% strength in water) after cooling to 30° C.

A dispersion having a solids content of 56.1%, a viscosity of 236 mPas (Brookfield 20 at 23° C.), a pH of 3.5 and a particle diameter Dw of 1570 nm was obtained. The sieve residue on sieving over 250 μm was 1 g. The K value was 91 and the Tg was 16° C. The free residual monomer was <100 ppm. The dispersion was stable in cement.

Comparative Example 7

Preparation of a Vinyl Acetate/ethylene Copolymer Having a High Ethylene Content A dispersion containing no acrylate but having a vinyl acetate/ethylene weight ratio of 70:30 was prepared analogously to example 6.

A dispersion having a solids content of 50.5%, a viscosity of 300 mPas (Brookfield 20 at 23° C.), a pH of 4.0 and a particle diameter Dw of 950 nm was obtained. The sieve residue on sieving over 250 μm was 40 g. The free residual monomer was <100 ppm. The dispersion was stable in cement.

Comparative Example 8

Preparation of a Vinyl Acetate/ethylene Copolymer Having a Low Ethylene Content A dispersion containing no acrylate but having a vinyl acetate/ethylene weight ratio of 95:5 was prepared analogously to example 6.

A dispersion having a solids content of 54.9%, a viscosity of 450 mPas (Brookfield 20 at 23° C.), a pH of 4.2 and a particle diameter Dw of 1100 nm was obtained. The sieve residue on sieving over 250 μm was 35 g. The free residual monomer was <100 ppm. The dispersion was stable in cement.

Comparative Example 9

All Acrylate Initially Introduced

A dispersion was prepared analogously to example 4 except that all of the methyl methacrylate was also initially introduced.

A dispersion was obtained but coagulated on cooling.

Comparative Example 10

Polymerization at 50° C.

A dispersion was prepared analogously to example 2 except that polymerization was effected at 50° C.

A dispersion having a solids content of 51.2%, a viscosity of 8500 mPas (Brookfield 20 at 23° C.) , a pH of 4.3 and a particle diameter Dw of 350 nm was obtained. The sieve residue on sieving over 250 μm was 500 g. The free residual monomer was <100 ppm. The dispersion was unstable in cement.

Powder Preparation

The dispersions from examples 1 to 6 and comparative examples 7 and 8 were mixed with 5% by weight (solid/solid) of polyvinyl alcohol having a degree of hydrolysis of 88 mol % and a Höppler viscosity of 4 mPas and were diluted with water to an atomization viscosity of 250 mPas. The dispersion was then sprayed by means of a binary nozzle. The atomizing component used was air precompressed to 4 bar, and the drops formed were dried cocurrently with air heated to 125° C. The dry powder obtained was mixed with 10% by weight of commercial antiblocking agent (mixture of calcium/magnesium/carbonate and magnesium hydrosilicate).

Redispersing Behavior of the Polymer Films 0.2 mm thick films were produced on glass plates from the dispersions of said examples (before spray-drying) and said films were dried for 15 minutes at 105° C. In order to check the film redispersibility, one water drop in each case was applied at room temperature by means of a pipette to a homogeneous area of the film to be tested and, after an action time of 60 seconds, the water drop was rubbed in the same area with a fingertip until the glass plate was film-free in this area or the film disintegrated into film fragments or was completely maintained.

The redispersibility of the polymer film was assessed using the following rating scheme:

Rating 1: film can be immediately redispersed by gentle rubbing or redisperses automatically;
Rating 2: film can be redispersed by rubbing, a few redispersible film fragments are possible;
Rating 3: film can be redispersed only by vigorous rubbing with formation of film fragments;
Rating 4: film cannot be redispersed even by prolonged vigorous rubbing but disintegrates into film fragments.

Determination of the Settling Behavior of the Powders (Tube Sediment)

To determine the settling behavior, 50 g of the dispersion powder in each case were redispersed in 50 ml of water and then diluted to 0.5% solids content and the height of solids sediment from 100 ml of this redispersion was introduced into a graduated tube and the settling after 1 hour was measured.

Determination of the Blocking Resistance

To determine the blocking resistance, the dispersion powder was introduced into an iron tube having a screw joint and then loaded with a metal stamp. After loading, the tube was stored in a drying oven for 16 hours at 50° C. After cooling to room temperature, the powder was removed from the tube and the blocking stability was determined qualitatively by crushing the powder. The blocking stability was classified as follows:

1=very good blocking stability
2=good blocking stability
3=satisfactory blocking stability
4=not stable to blocking, powder no longer free-flowing after crushing.

Determination of the Cement Stability

A cement mix having the following formulation was prepared:

| | |
|---|---|
| Portland cement | 82.5 g |
| Calcite CaCo$_3$ 10–40 mm | 75 g |
| Quartz sand 200–500 mm | 142 g |
| Dispersion powder | 14.5 g |
| Water | 85 g |

The processibility of the cement mix was observed over a period of 2 hours and assessed qualitatively.

The monomer contents of the various polymers are set forth below in Table 1, while test results on the polymer are set forth below in Table 2.

TABLE 1

| Example | Vinyl Acetate | Ethylene | Butyl Acrylate | 2-ethylhexyl Acrylate | Methyl Methacrylate | Norbornyl Acrylate |
|---|---|---|---|---|---|---|
| 1 | 60.0 | — | 40.0 | — | — | — |
| 2 | 30.9 | 22.2 | 46.9 | — | — | — |
| 3 | 31.0 | 22.1 | 39.4 | 7.5 | — | — |
| 4 | 72.7 | 9.1 | — | — | 18.2 | — |
| 5 | 71.4 | 10.7 | — | — | — | 17.9 |
| 6 | 72.6 | 9.2 | — | — | — | 18.2 |
| 7 | 70.0 | 30.0 | — | — | — | — |
| 8 | 95.0 | 5.0 | — | — | — | — |
| 9 | 72.7 | 9.1 | — | — | 18.2 | — |
| 10 | 30.9 | 22.2 | 46.9 | — | — | — |

TABLE 2

| Example | Redispersibility | Tube sediment [cm] | Blocking resistance | Cement stability |
|---|---|---|---|---|
| Ex. 1 | 1 | 1.5 | 1 | Stable |
| Ex. 2 | 1 | 2.0 | 1–2 | Stable |
| Ex. 3 | 1 | 1.0 | 1 | Stable |
| Ex. 4 | 1 | 1.0 | 1 | Stable |
| Ex. 5 | 1 | 1.0 | 1 | Stable |
| Ex. 6 | 1 | 1.0 | 1 | Stable |
| C.Ex. 7 | 1 | 1.0 | 1 | Stable |
| C.Ex. 8 | 1 | 1.5 | 1 | Stable |
| C.Ex. 9 | | | | Unstable |
| C.Ex. 10 | | | | Unstable |

By the procedure according to the invention, it is possible to obtain products having blocking resistance and hence shelf life of the powders comparable with the conventional vinyl acetate/ethylene powders. The redispersibility and cement stability are also comparable.

The adhesive strengths in the tile adhesive were checked in the following formulation (6% by weight plastics content):

| | |
|---|---|
| Quartz sand | 586 parts |
| Portland cement | 350 parts |
| Cellulose | 4 parts |
| Dispersion powder | 60 parts |

The adhesive strengths based on 4 storage conditions were determined:

| | |
|---|---|
| 28D: | Dry storage for 28 days |
| 7D/21W: | Dry storage for 7 days/wet storage for 21 days |
| 14D/14D70° C./1D: | Storage at elevated temperature |
| Freezing-thawing: | Storage with freezing and thawing |

The results are summarized in Table 3: Table 3:

TABLE 3

The results are summarized in Table 3:

| Ex. | Elongation at break % | RF N/mm$^2$ | 28 D N/mm$^2$ | 7 D/21 W N/mm$^2$ | 14 D/14 D 70° C./1 D N/mm$^2$ | Freezing-thawing N/mm$^2$ |
|---|---|---|---|---|---|---|
| Ex. 1 | 391 | 7.2 | 1.65 | 0.81 | 1.44 | 0.81 |
| Ex. 2 | 299 | 3.3 | 1.43 | 0.88 | 1.28 | 0.86 |
| Ex. 3 | 241 | 1.8 | 1.56 | 0.83 | 1.33 | 0.83 |
| Ex. 4 | 263 | 15.0 | 2.10 | 0.92 | 1.82 | 0.94 |
| Ex. 5 | 254 | 12.9 | 1.73 | 0.79 | 1.71 | 0.76 |
| Ex. 6 | 283 | 17.1 | 1.88 | 0.84 | 2.10 | 0.96 |
| C.Ex. 7 | 400 | 6.5 | 1.05 | 0.85 | 1.28 | 0.87 |
| C.Ex. 8 | 250 | 16.5 | 2.06 | 0.70 | 1.32 | 0.80 |

Discussion of the Results

The powder according to the invention from Example 6 shows a combination of good adhesive strengths after storage under all conditions in comparison with the powders from comparative Examples 7 and 8. The powder from comparative Example 7 performs poorly when stored under standard temperature and humidity conditions (low Tg). The powder from comparative Example 8 performs poorly on wet storage (high Tg but little ethylene and therefore susceptible to hydrolysis). By using hard acrylates, a large amount of ethylene (hydrolysis stability) can be incorporated and a high Tg nevertheless maintained. Particularly evident are the advantages of the strength after storage at elevated temperature. The comparison between Example 5 and Example 6 shows that it is more advantageous initially to introduce some of the acrylate in the polymerization.

I claim:

1. A process for the preparation of polyvinyl alcohol-stabilized polymers based on vinyl ester, (meth)acrylate and optionally ethylene monomers in the form of their aqueous dispersions and dispersion powders redispersible in water, by means of free radical emulsion polymerization or suspension polymerization of one or more monomers selected from the group consisting of the esters of acrylic acid and methacrylic acid with vinyl esters, optionally ethylene and optionally further monomers copolymerizable therewith, in the presence of one or more polyvinyl alcohol protective colloids, and optionally drying of the aqueous dispersion obtained thereby, wherein a) from 50 to 100% by weight of the total weight of vinyl ester monomers employed, from 0 to 40% by weight of the total weight of (meth)acrylate monomers employed and at least 80% by weight of the total weight of ethylene employed are initially introduced in the polymerizations and b) the polymerization is carried out at a temperature of ≧60° C.

2. The process as claimed in claim 1, wherein polymerization is effected with the use of from 0.3 to 0.7% by weight of initiator, based on the total weight of the monomers.

3. The process as claimed in claim 1, wherein the polymerization temperature is from 65° C. to 90° C.

4. The process of claim 1, wherein vinyl ester monomers and methacrylate monomers and optionally ethylene are copolymerized.

5. The process as claimed in claim 1, wherein 100% by weight of the total weight of vinyl ester employed are initially introduced.

6. The process as claimed in claim 1, wherein 100% by weight of the total weight of (meth)acrylate monomers employed are metered in.

7. The process of claim 1, wherein partially hydrolyzed polyvinyl alcohols having a degree of hydrolysis of from 80 to 95 mol % and a Höppler viscosity, in 4% strength aqueous solution, of from 1 to 30 mPas (Höppler method at 20° C., DIN 53015) or partially hydrolyzed polyvinyl alcohol rendered hydrophobic and having a degree of hydrolysis of from 80 to 95 mol % and a Höppler viscosity, in 4% strength aqueous solution, of from 1 to 30 mPas, or mixtures thereof are used.

8. The process of claim 1, wherein polyvinyl alcohols having a degree of hydrolysis of from 85 to 94 mol % and a Höppler viscosity, in 4% strength aqueous solution, of from 3 to 15 mPas (Höppler method at 20° C., DIN 53015) are used.

9. The. process of claim 1, wherein at least 5% by weight of the total amount of protective colloid employed are initially introduced.

10. The process of claim 1, wherein polymerization is effected in the presence of from 0.01 to 5.0% by weight of regulators, based on the monomers to be polymerized.

11. The process of claim 1, wherein for the preparation of the polymer powders redispersible in water, the aqueous dispersions are dried by means of spray-drying.

* * * * *